United States Patent
Heyne et al.

(10) Patent No.: US 10,894,480 B2
(45) Date of Patent: Jan. 19, 2021

(54) SUPPLYING OF LOW-VOLTAGE ON-BOARD ELECTRICAL SYSTEMS OF VEHICLES HAVING AN ELECTRIC DRIVE

(71) Applicant: Dr. Ing. h.c. F. Porsche Aktiengesellschaft, Stuttgart (DE)

(72) Inventors: Raoul Heyne, Wiernsheim (DE); Christian Metzger, Tamm (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/151,434

(22) Filed: Oct. 4, 2018

(65) Prior Publication Data

US 2019/0106003 A1    Apr. 11, 2019

(30) Foreign Application Priority Data

Oct. 5, 2017    (DE) .................. 10 2017 123 071

(51) Int. Cl.
| | |
|---|---|
| *B60L 53/22* | (2019.01) |
| *B60L 53/14* | (2019.01) |
| *B60L 53/66* | (2019.01) |
| *B60L 53/10* | (2019.01) |
| *B60L 58/21* | (2019.01) |

(52) U.S. Cl.
CPC .............. *B60L 53/22* (2019.02); *B60L 53/11* (2019.02); *B60L 53/14* (2019.02); *B60L 53/665* (2019.02); *B60L 58/21* (2019.02); *B60L 2210/10* (2013.01); *B60L 2210/30* (2013.01)

(58) Field of Classification Search
CPC ....................................................... B60L 53/22
USPC ........................................................ 320/109
See application file for complete search history.

(56) References Cited

U.S. PATENT DOCUMENTS

| | | | |
|---|---|---|---|
| 9,505,318 B2 | 11/2016 | Hendrix et al. | |
| 2016/0137073 A1* | 5/2016 | Krammer | H02J 50/10 320/108 |
| 2019/0071033 A1* | 3/2019 | Hinterberger | B60R 16/023 |

FOREIGN PATENT DOCUMENTS

| | | |
|---|---|---|
| DE | 102015006205 A1 | 12/2015 |
| JP | 2017143710 A | 8/2017 |
| KR | 20140079626 A | 6/2014 |
| KR | 20170069375 A | 6/2017 |

OTHER PUBLICATIONS

English Translation of the Notice of Reasons for Refusal for Japanese Application No. 2018-188032, dated Sep. 25, 2019, 4 pages.

(Continued)

*Primary Examiner* — Eric D Lee
(74) *Attorney, Agent, or Firm* — RatnerPrestia

(57) ABSTRACT

A charging station for a vehicle having an electric drive, wherein the charging station configured to charge a high-voltage energy storage of the vehicle, including an electrical high-voltage provision device, and an electrical high-voltage connection device for connecting the high-voltage provision device to the high-voltage energy storage of the vehicle, an electrical low-voltage provision device, and a separate low-voltage connection terminal for connection to a low-voltage on-board electrical system of the vehicle, wherein the low-voltage on-board electrical system is able to be supplied with electrical energy independently of the high-voltage connection device by way of the low-voltage connection terminal.

9 Claims, 1 Drawing Sheet

(56) References Cited

OTHER PUBLICATIONS

"[Just insert it into a cigarette lighter] an item which can be charged from the inside of a battery", Kotsu Times Sha, WEB CARTOP editing portion, 2016, 9 pages, Internet <URL:https://www.webcartop.jp/2016/12/56592>.
Korean Notice of Preliminary Rejection for Korean Application No. 10-2018-0117960, dated Mar. 9, 2020, with translation, 7 pages.

* cited by examiner

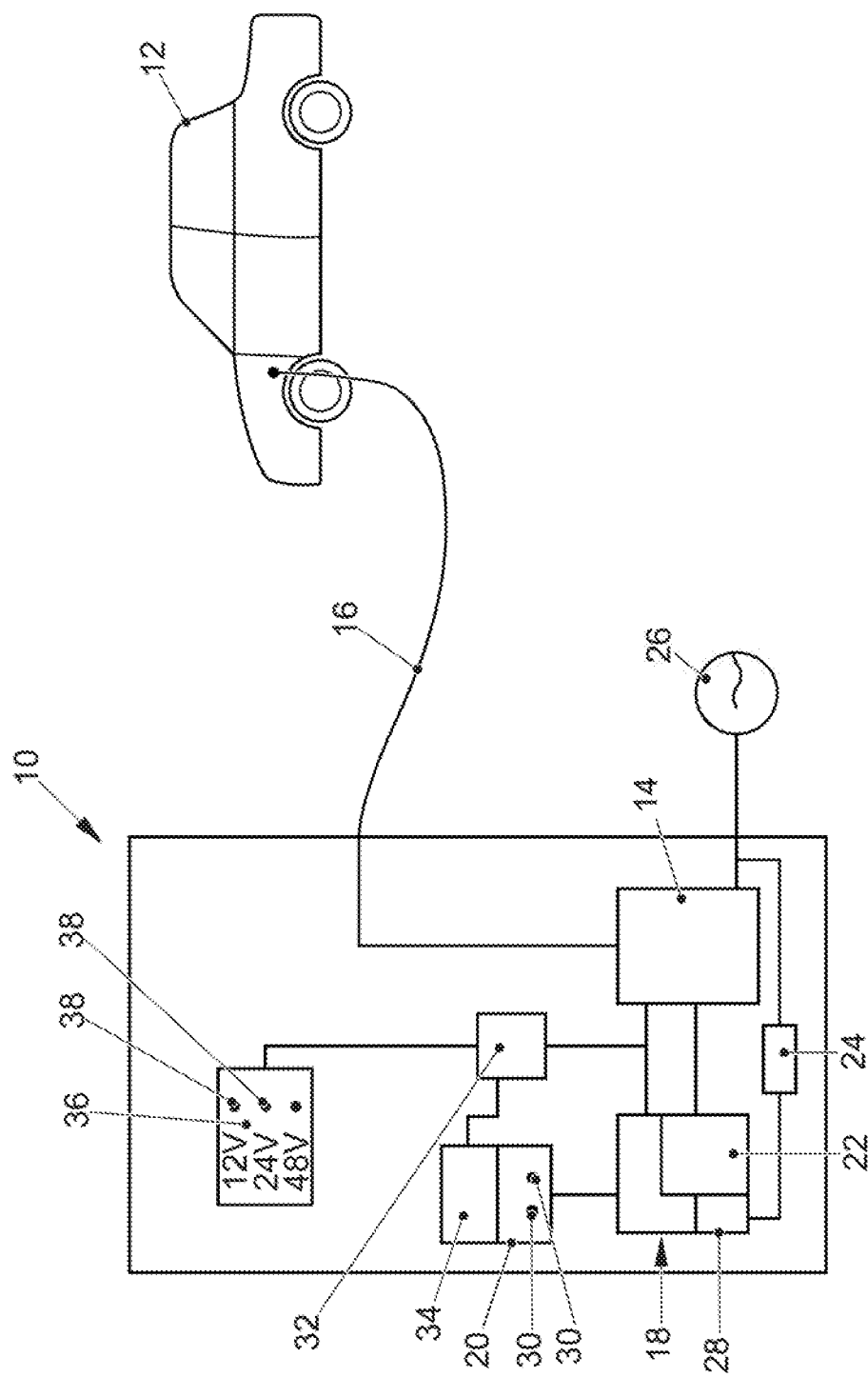

SUPPLYING OF LOW-VOLTAGE ON-BOARD ELECTRICAL SYSTEMS OF VEHICLES HAVING AN ELECTRIC DRIVE

CROSS-REFERENCE TO RELATED APPLICATION

This application claims priority to German Patent Application No. 10 2017 123 071.8 Oct. 5, 2017, the content of such application being incorporated by reference herein in its entirety.

FIELD OF THE INVENTION

The present invention relates to a charging station for at least one vehicle having an electric drive, wherein the charging station is configured to charge a high-voltage energy storage of the vehicle, comprising an electrical high-voltage provision device, and an electrical high-voltage connection device for connecting the high-voltage provision device to the high-voltage energy storage of the vehicle.

BACKGROUND OF THE INVENTION

Charging stations of this type are used to charge electrical energy storage elements of vehicles having electric drives with high-voltage DC voltages and DC currents, such that high electric powers are provided for the rapid charging of such vehicles. The vehicles may be driven purely electrically, as what are called electric vehicles, or may have, in addition to the electric drive, a further drive, for example having a combustion engine. The latter vehicles are commonly referred to as hybrid vehicles.

Rapid charging thus concerns a rechargeable electrical high-voltage energy storage for driving the vehicle. The energy storage, also commonly referred to as a drive battery or high-voltage battery, comprises a plurality of individual storage cells that are connected in parallel and/or in series in order to provide necessary high-voltage DC voltages and DC currents for driving the vehicle.

In addition, the vehicles are commonly configured with a low-voltage on-board electrical system, as is used in normal modern vehicles. In the case of passenger vehicles, the on-board electrical system is usually based on a supply voltage of 12 volts. The low-voltage on-board electrical system is used to supply all the other loads in the vehicle. The low-voltage on-board electrical system therefore usually comprises a separate energy storage, which is typically referred to as a low-voltage on-board electrical system battery.

In order for the rapid charging of the high-voltage energy storage to be able to be performed, the low-voltage on-board electrical system, including the low-voltage on-board electrical system battery that is used therein, has to be operative. This is necessary in order to allow the vehicle to communicate with the charging station. This communication is a prerequisite for starting a process of charging the high-voltage energy storage at the charging station. Furthermore, vehicle protection systems that are used in the vehicle and require a high inrush current have to be switched using energy from the low-voltage on-board electrical system. The vehicle protection systems are connected as a safety device upstream of the electrical rechargeable electrical high-voltage energy storage, such that the vehicle, more precisely the rechargeable electrical high-voltage energy storage, is able to be charged by way of the charging station only after the protection systems are actuated.

In order to initialize charging and switch on the vehicle protection systems, a minimal amount of energy is thus required, which has to be able to be drawn from the low-voltage on-board electrical system. The energy thus has to be provided by way of the low-voltage on-board electrical system battery and therefore also be stored therein. Therefore, discharging of the low-voltage on-board electrical system battery may lead to the rechargeable electrical high-voltage energy storage not being able to be charged upon connection to the charging station.

Discharging of the low-voltage on-board electrical system, battery may occur for example if the vehicle is not used over a relatively long period of time, since modern vehicles, when they are not being used, are operated in a standby mode, for example in order to detect actuation of unlocking of the vehicle by way of a remote command. Discharging of the low-voltage on-board electrical system battery may also readily take place if for example a vehicle light or other electrical loads are intentionally or unintentionally left on for a relatively long time.

In the case of progressive discharge, the low-voltage on-board electrical system battery may be recharged by way of the high-voltage energy storage, but if the high-voltage energy storage also reaches its lower charge limit, or is not able to recharge the low-voltage on-board electrical system battery for example for thermal reasons, then the low-voltage on-board electrical system battery is completely discharged such that, even in for example changed thermal conditions, it is no longer possible to recharge from the high-voltage energy storage. It is then impossible either to start or to charge the vehicle.

In this case, the low-voltage on-board electrical system battery is only able to be charged by external battery-charging appliances. However, these battery-charging appliances are not always within immediate reach or available. As an alternative, the low-voltage on-board electrical system battery may also be exchanged in order to make the vehicle ready for use again. However, this may pose problems in the case of modern vehicles, as the on-board electrical system is completely deactivated for a short time due to the exchange. This may in some instances require activation of vehicle components, which is time-consuming and complicated.

Charging plugs for charging stations are known, these also providing, in addition to a high voltage, a low voltage for operating the low-voltage on-board electrical system, but, for the reasons mentioned above, this is only possible when the low-voltage on-board electrical system battery contains enough energy to begin a supply by way of the charging plug. In the event of excessive discharging of the low-voltage on-board electrical system battery, the low voltage by way of the charging plug is also not able to assist in beginning the process of charging the vehicle.

In this connection, DE 10 2015 006 205 A1, which is incorporated by reference herein, discloses a charging arrangement for charging a high-voltage battery for a motor vehicle. The charging arrangement has a first terminal for coupling to a first energy source external to the motor vehicle, and a first coupling device. The first terminal is able to be coupled to the high-voltage battery by way of the first coupling device in order to charge the high-voltage battery. Furthermore, the charging arrangement has a second terminal for coupling to a second energy source external to the motor vehicle, which second terminal is able to be coupled to an electrical component of the motor vehicle by way of a second coupling device of the charging arrangement, different from the first one, in order to supply, externally to the motor vehicle, the electrical component of the motor vehicle.

Furthermore, U.S. Pat. No. 9,505,318 B2, which is incorporated by reference herein, discloses an electric vehicle charging system. The electric vehicle charging system comprises one or more system power-train control modules (SPCM) and vehicle charging stations (VCS). The SPCM current is distributed to the VCS by a current source, and the VCS distributes the power to one or more electric vehicles. A further electric vehicle charging system comprises an SPCM, a VCS, a fleet management system (FMS) for monitoring and controlling the charging system, and a communication network for exchanging information. A system for managing a plurality of electric vehicles comprises a plug-in module that is configured to collect and to store information from an on-board diagnostic system of at least one of the multiplicity of electric vehicles, from management software, from a communication network and from a smart device. A software application is used to display system information.

SUMMARY OF THE INVENTION

On the basis of the abovementioned prior art, the invention is thus based on the object of specifying a charging station for a vehicle having an electric drive of the abovementioned type, which charging station allows the vehicle to be charged easily, even in the event of a failure of the low-voltage on-board electrical system or in the event of a deep discharge.

The object is achieved according to aspects of the invention by the features of the independent claim. Advantageous refinements of the invention are specified in the dependent claims.

According to aspects of the invention, a charging station for a vehicle having an electric drive is thus specified, wherein the charging station is configured to charge a high-voltage energy storage of the vehicle, comprising an electrical high-voltage provision device, and an electrical high-voltage connection device for connecting the high-voltage provision device to the high-voltage energy storage of the vehicle, wherein the charging station has an electrical low-voltage provision device and a separate low-voltage connection terminal for connection to a low-voltage on-board electrical system of the vehicle, wherein the low-voltage on-board electrical system is able to be supplied with electrical energy independently of the high-voltage connection device by way of the low-voltage connection terminal.

The idea underlying the present invention is thus that of using the charging station additionally to provide low voltage independently of the high-voltage connection device, by way of which low voltage the low-voltage on-board electrical system of the vehicle is able to be operated, or by way of which low voltage the low-voltage on-board electrical system battery is able to be charged. If the low-voltage on-board electrical system battery has a sufficient state of charge, this may be used to operate the low-voltage on-board electrical system of the vehicle. The charging of the low-voltage on-board electrical system battery is thus made possible directly at the charging station and by the charging station. In the case of a vehicle having a deeply discharged low-voltage on-board electrical system battery as well, the high-voltage energy storage of said vehicle may therefore be charged at the charging station. A situation is likewise achieved whereby the vehicle is able to be started again, even if the low-voltage on-board electrical system battery is discharged and/or defective, in that the low-voltage on-board electrical system of the vehicle is activated to an extent that the low-voltage on-board electrical system of the vehicle is able to be supplied from the high-voltage energy storage by way of a DC-to-DC converter internal to the vehicle. As a result, it may be made possible for example to travel further with the vehicle as far as a nearby garage.

The charging station is thus connected directly to the low-voltage on-board electrical system by way of the low-voltage connection terminal. This may be performed in the manner of a jump start, which is nowadays known in the case of combustion engines, in which a proprietary low-voltage on-board electrical system battery is bridged with an externally provided low voltage. The electrical energy is in this case preferably provided without previous communication or a type of 'handshake' between the vehicle and the charging station.

The electrical high-voltage provision device concerns a provision device for providing electrical energy for the charging or rapid charging of the high-voltage energy storage of the vehicle. The high-voltage provision device is normally configured to provide a charging voltage of several hundred volts and a charging current that is likewise high. The high-voltage provision device typically provides a DC voltage.

The electrical high-voltage connection device may be configured as a connecting cable having a standard-compliant connecting plug for connecting the high-voltage provision device to the high-voltage energy storage of the vehicle. As an alternative, the electrical high-voltage connection device may be configured for example as a charging jack in order to connect a corresponding cable of the vehicle thereto or in order to connect a separate cable between the vehicle and the high-voltage connection device.

The electrical low-voltage provision device concerns a provision device for providing electrical energy for supplying the low-voltage on-board electrical system of the vehicle. The low-voltage provision device is normally configured to provide a charging voltage of less than 60 volts. The low-voltage provision device typically provides a DC voltage.

The low-voltage connection terminal is configured for connection to the low-voltage on-board electrical system of the vehicle and is independent of the high-voltage connection device. The connection terminal may be configured differently, in order to produce a connection to the low-voltage on-board electrical system of the vehicle. Operational safety must be ensured here, inter alia.

In one advantageous refinement of the invention, the electrical low-voltage provision device is configured to provide a DC voltage of 12 V, 24 V and/or 48 V. Corresponding low voltages are used for different vehicles, such that these vehicles are able to connect their low-voltage on-board electrical system to the low-voltage connection terminal. The low-voltage provision device is preferably configured to provide a plurality of the abovementioned DC voltages alternatively or at the same time. Accordingly, the low-voltage connection terminal may be configured for example with electrical contacts or terminals for providing a plurality of DC voltages at the same time. As an alternative, the low-voltage provision device may be able to be switched between the DC voltages.

In one advantageous refinement of the invention, the low-voltage connection terminal has electrical contacts for contacting electrical terminals for connection to the low-voltage on-board electrical system of the vehicle. The contacts enable universal contacting with different electrical terminals. Contacts and terminals are known per se in the prior art.

In one advantageous refinement of the invention, the electrical low-voltage provision device has an electrical voltage converter that is electrically connected to the electrical high-voltage provision device, wherein the electrical low-voltage provision device is configured to supply the low-voltage connection terminal with electrical energy from the electrical high-voltage provision device by way of the electrical voltage converter. The electrical energy is thus provided at the low-voltage connection terminal, in that it is supplied by the high-voltage provision device. The low-voltage provision device therefore does not need its own connection to an external electrical energy supply, which facilitates installation of the charging station. The voltage converter is in this case configured as a step-down converter that converts the high voltage of the high-voltage provision device into a low voltage. The voltage converter may directly provide the low voltage provided at the low-voltage connection terminal, or an intermediate voltage that is converted further.

In one advantageous refinement of the invention, the charging station has a transformer, the electrical low-voltage provision device is connected to an AC voltage source by way of the transformer, and the transformer is configured to transform a voltage of the AC voltage source into a suitable low voltage in order to supply the low-voltage connection terminal by way of the low-voltage provision device.

The low-voltage provision device may therefore be operated independently of the high-voltage provision device, for example including in the event of a fault with the high-voltage provision device. In principle, the low-voltage provision device may also be connected to a separate AC voltage source. The low-voltage provision device preferably comprises a rectifier in order to convert the AC voltage of the AC voltage source into a DC voltage for supplying the low-voltage connection terminal. In principle, the transformer may also be replaced with an electronic voltage converter.

In one advantageous refinement of the invention, the charging station has a control device that is configured to control the supply of electrical energy to the low-voltage connection terminal by way of the electrical low-voltage provision device. The control device allows targeted control of the supply to the low-voltage connection terminal, for example with a constant low voltage. The control device may also be suitable for performing driving with a charging curve for charging the low-voltage on-board electrical system battery.

In one advantageous refinement of the invention, the charging station has a measurement device for recording an external voltage connected to the low-voltage connection terminal, and the control device is configured to control or to regulate the supply of electrical energy to the low-voltage connection terminal depending on the recorded external voltage. Automatic adjustment of the low voltage at the low-voltage connection terminal may thus take place, for example.

In one advantageous refinement of the invention, the control device is configured, depending on the recorded external voltage, to record a polarity of the low-voltage on-board electrical system connected to the low-voltage connection terminal, and to control the supply of electrical energy to the low-voltage connection terminal depending on the recorded polarity. The polarity may thus preferably be checked before starting the supply by way of the low-voltage connection terminal in order to prevent possible damage caused by supplying the low-voltage connection terminal with electrical energy. To this end, the polarity is recorded by way of a sign of the voltage present at the low-voltage connection terminal. In this case, a residual voltage of the low-voltage on-board electrical system, which residual voltage is also able to be detected in the case of a highly discharged low-voltage on-board electrical system battery, is sufficient to detect the polarity.

In one advantageous refinement of the invention, the control device is configured, depending on the recorded external voltage, to record a correct connection to the low-voltage on-board electrical system, and to control or to regulate the supply of electrical energy to the low-voltage connection terminal depending on the correct connection to the low-voltage on-board electrical system. It may thus be ensured, for example, that a low-voltage on-board electrical system is actually connected to the low-voltage connection terminal. To protect against misuse, there may also be a prerequisite for a residual voltage of the low-voltage on-board electrical system battery to be present. In this case, the residual voltage may be low. If a voltage is recorded at the low-voltage connection terminal that is not typical for a low-voltage on-board electrical system or a low-voltage on-board electrical system battery, the control device may prevent or stop the supply of electrical energy to the low-voltage connection terminal. Of course, the supply of electrical energy may nevertheless be provided after a corresponding input from a user.

In one advantageous refinement of the invention, the charging station has an operating device, and the control device for controlling the supply of electrical energy to the low-voltage connection terminal is able to be activated and possibly able to be configured by way of the operating device. It is possible for example to configure the supply of electrical energy to the low-voltage connection terminal with a desired low voltage and then start the supply by way of the operating device. In addition, an identification of the vehicle or of a driver of the vehicle may be performed. In addition, an instruction for using the low-voltage connection terminal may be provided by way of the operating device. The operating device may be kept simple, and may comprise for example a selection button or selection switch for selecting a desired low voltage, and a start button.

BRIEF DESCRIPTION OF THE DRAWINGS

The invention is explained below by way of example with reference to the appended drawing and on the basis of a preferred exemplary embodiment, wherein the features presented below may in each case individually or in combination represent an aspect of the invention.

The FIGURE shows a schematic depiction of a charging station according to a first preferred embodiment with, a vehicle connected thereto.

DETAILED DESCRIPTION OF THE INVENTION

The FIGURE shows a charging station 10 according to aspects of the invention according to a first preferred embodiment. The charging station 10 is connected to a vehicle 12.

The vehicle 12 comprises an electric drive that is fed from an internal rechargeable electrical high-voltage energy storage. The high-voltage energy storage comprises a plurality of individual storage cells that are connected in parallel and in series in order to provide required high-voltage DC voltages of several hundred volts and a required DC current for driving the vehicle 12.

The vehicle 12 additionally comprises a low voltage on-board electrical system based on a low voltage of 12 volts in this case, by way of example. The low-voltage on-board electrical system is used to supply all of the loads in the vehicle 12, other than the drive. The low-voltage on-board electrical system comprises a low-voltage on-board electrical system battery as a separate energy storage.

The charging station 10 comprises an electrical high-voltage provision device 14 and an electrical high-voltage connection device 16 for connecting the high-voltage provision device 14 to the high-voltage energy storage of the vehicle 12. The electrical high-voltage provision device 14 concerns a provision device for providing electrical energy for the charging or rapid charging of the high-voltage energy storage of the vehicle 12. The high-voltage provision device 14 is configured to provide a charging voltage of several hundred volts and a charging current that is likewise high. The high-voltage provision device 14 in this case provides a DC voltage.

The electrical high-voltage connection device 16 is in this case configured as a connecting cable having a standard-compliant connecting plug for connecting the high-voltage provision device 14 to the high-voltage energy storage by way of a charging jack of the vehicle 12.

The charging station 10 further comprises an electrical low-voltage provision device 18 and a separate low-voltage connection terminal 20 for connection to the low-voltage on-board electrical system of the vehicle 12, wherein the low-voltage on-board electrical system is able to be supplied with electrical energy independently of the high-voltage connection device 16 by way of the low-voltage connection terminal 20.

To this end, the electrical low-voltage provision device 18 comprises an electrical voltage converter 22 that is electrically connected to the electrical high-voltage provision device 14. The voltage converter 22 is configured as a step-down converter that converts the high voltage of the high-voltage provision device 14 into a suitable low voltage.

The charging station 10 additionally has a transformer 24. The electrical low-voltage provision device 18 is connected to an AC voltage source 26 by way of the transformer 24 and transforms a voltage of the AC voltage source 26 into a suitable lower voltage. The low-voltage provision device 18 comprises a rectifier 28, by way of which the low-voltage provision device 18 is connected to the transformer 24. The same AC voltage source 26 is also connected to the high-voltage provision device 14 in order to supply same.

The low-voltage provision device 18 is accordingly configured both to convert the AC voltage of the AC voltage source 26 into a DC voltage for supplying the low-voltage connection terminal 20 and to supply the low-voltage connection terminal 20 with electrical energy from the electrical high-voltage provision device 14 by way of the electrical voltage converter 22, wherein the voltage converter 22 directly provides the low voltage provided at the low-voltage connection terminal 20. The supply is thus configured to be redundant.

The low-voltage connection terminal 20 comprises electrical contacts 30 for contacting electrical terminals for connection to the low-voltage on-board electrical system of the vehicle 12. The low voltage provided by the low-voltage provision device 18 is present at the contacts 30.

The charging station 10 furthermore has a control device 32 that is configured to control the supply of electrical energy to the low-voltage connection terminal 20. The control device 32 is furthermore configured to control the high-voltage provision device 14 for providing the DC voltage for the rapid charging of the high-voltage energy storage of the vehicle 12.

The charging station 10 additionally comprises a measurement device 34 for recording an external voltage connected to the low-voltage connection terminal 20. The recorded external voltage is transmitted by the measurement device 34 to the control device 32.

The charging station 10 furthermore has an operating device 36, by way of which a supply of electrical energy to the low-voltage connection terminal 20 is able to be activated and able to be configured. To this end, the operating device 36 is connected to the control device 32, which drives the low-voltage provision device 13 and possibly the high-voltage provision device 14 according to the operation. The operating device 36 is kept simple in this case, with selection buttons 38 for selecting a desired low voltage, which at the same time trigger a start function for starting the supply by way of the low-voltage connection terminal 20 in the control device 32.

Depending on the operation of the operating device 36 and with the measurement device 34 external voltage present at the low-voltage connection terminal 20, the control device 32 controls the supply of electrical energy to the low-voltage connection terminal 20.

To this end, the electrical low-voltage provision device 18 is set, in accordance with the operation, of the operating device 36, to provide a DC voltage of 12 V, 24 V, 48 V and/or less than 60 V. The low voltage is thus adjusted at the low-voltage connection terminal 20 in accordance with the operation. The low-voltage provision device 18 is accordingly able to be switched between the different AC voltages. The switching takes place, in the case of the voltage converter 22, by way of corresponding driving by the control device 32. In the case of the redundant path with the transformer 24 and the rectifier 28, a downstream converter, not shown here, for example a DC-to-DC converter, may be driven accordingly.

The control device 32 first of all performs a test as to whether the external voltage recorded by the measurement device 34 corresponds to the polarity of the contacts 30 of the low-voltage connection terminal 20 in terms of its sign. The polarity is checked before starting the supply by way of the low-voltage connection terminal 20. If the polarity is not correct, the low-voltage provision device 18 is driven by the control device 32 so as not to supply electrical energy to the low-voltage connection terminal 20, other than after a corresponding input by a user if the low-voltage vehicle battery is not present.

Furthermore, a correct connection of the low-voltage connection terminal 20 to the low-voltage on-board electrical system of the vehicle 12 is recorded by the control device 32 depending on the recorded external voltage. If a voltage is recorded at the low-voltage connection terminal 20 that is not typical for a low-voltage on-board electrical system or a low-voltage on-board electrical system battery, the supply of electrical energy to the low-voltage connection terminal 20 is prevented or stopped by the control device 32.

In the case of a correct connection of the low-voltage connection terminal 20 to the low-voltage on-board electrical system of the vehicle, the supply of a low voltage to the low-voltage connection terminal 20 is controlled in accordance with a charging curve for charging the low-voltage on-board electrical system battery.

What is claimed is:

1. A charging station for a vehicle having an electric drive, wherein the charging station is configured to charge a high-voltage energy storage of the vehicle, comprising:
   an electrical high-voltage provision device;
   an electrical high-voltage connection device for connecting the high-voltage provision device to the high-voltage energy storage of the vehicle;
   an electrical low-voltage provision device;
   a low-voltage connection terminal for connection to a low-voltage on-board electrical system of the vehicle, the low-voltage connection terminal separate from the electrical high-voltage connection device, wherein the low-voltage on-board electrical system is able to be supplied with electrical energy independently of the high-voltage connection device by way of the low-voltage connection terminal; and
   a transformer separate from the electrical high-voltage provision device,
   wherein the electrical low-voltage provision device is configured to be connected to an AC voltage source by way of the transformer,
   wherein the transformer is configured to transform a voltage of the AC voltage source into a suitable low voltage in order to supply the low-voltage connection terminal by way of the low-voltage provision device,
   wherein the electrical low-voltage provision device has an electrical voltage converter that is electrically connected to the electrical high-voltage provision device, and
   wherein the electrical low-voltage provision device is configured to supply the low-voltage connection terminal with electrical energy from the electrical high-voltage provision device by way of a redundant path that includes the electrical voltage converter and is separate from the transformer.

2. The charging station as claimed in claim 1, wherein the electrical low-voltage provision device is configured to provide a DC voltage of at least one of 12 V, 24 V, 48 V and/or 60V.

3. The charging station as claimed in claim 1, wherein the low-voltage connection terminal has electrical contacts for contacting electrical terminals for connection to the low-voltage on-board electrical system of the vehicle.

4. The charging station as claimed in claim 1, further comprising:
   a control device configured to control the supply of electrical energy to the low-voltage connection terminal by way of the electrical low-voltage provision device.

5. The charging station as claimed in claim 4, further comprising:
   a measurement device for recording an external voltage connected to the low-voltage connection terminal; wherein the control device is configured to control the supply of electrical energy to the low-voltage connection terminal depending on the recorded external voltage.

6. The charging station as claimed in claim 5, wherein the control device is configured, depending on the recorded external voltage, to record a polarity of the low-voltage on-board electrical system connected to the low-voltage connection terminal, and to control the supply of electrical energy to the low-voltage connection terminal depending on the recorded polarity.

7. The charging station as claimed in claim 5, wherein the control device is configured, depending on the recorded external voltage, to record a correct connection to the low-voltage on-board electrical system, and to control the supply of electrical energy to the low-voltage connection terminal depending on the correct connection to the low-voltage on-board electrical system.

8. The charging station as claimed in claim 4, further comprising:
   an operating device;
   wherein the control device for controlling the supply of electrical energy to the low-voltage connection terminal is able to be activated by way of the operating device.

9. The charging station as claimed in claim 8, wherein the control device is able to be configured by way of the operating device.

* * * * *